United States Patent Office 2,953,920
Patented Sept. 27, 1960

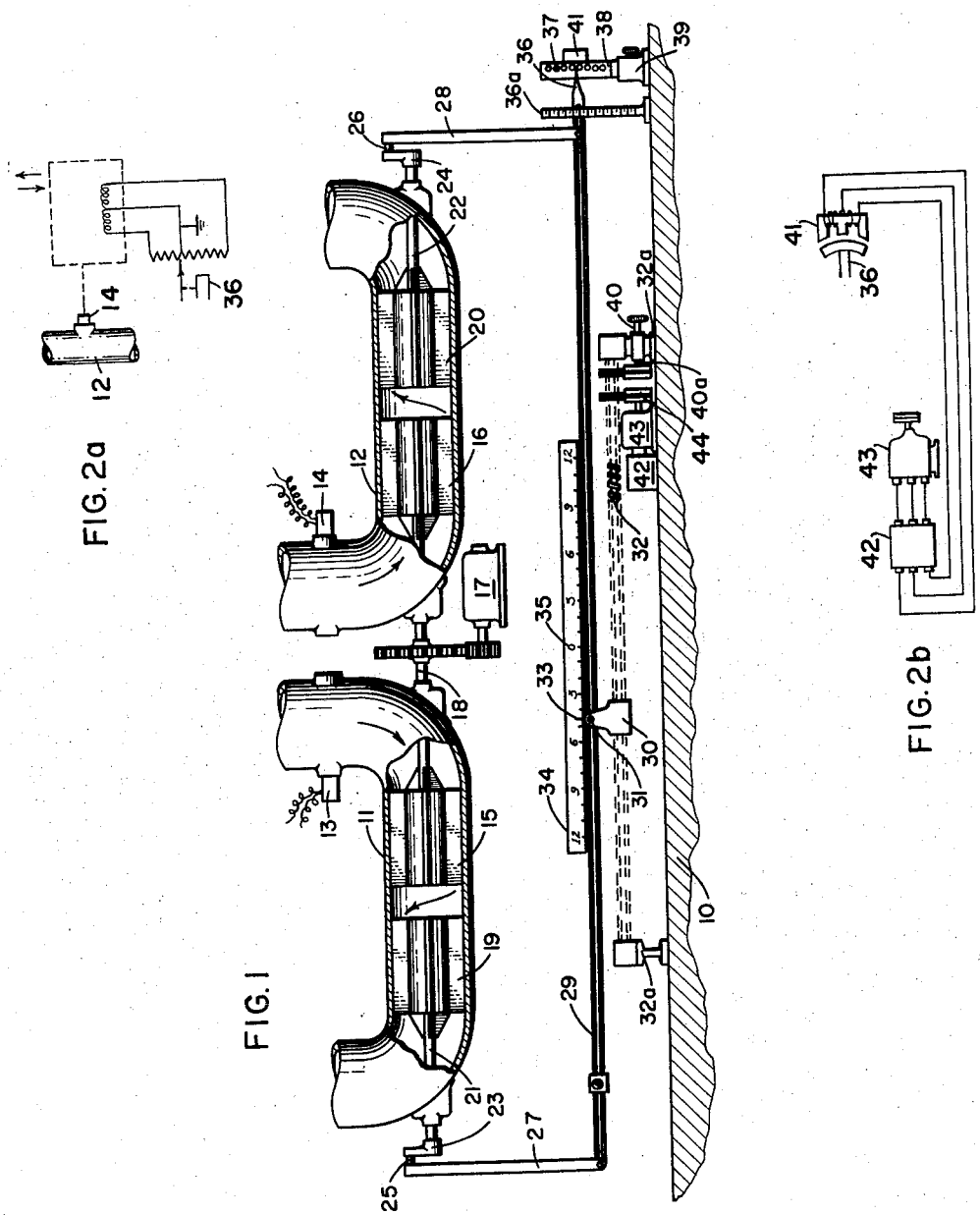

2,953,920

DEVICE FOR DETERMINING FLOW RATIO

Sigmund H. Machlanski, Glendora, Calif., assignor to Aerojet-General Corporation, Azusa, Calif., a corporation of Ohio Filed Oct. 1, 1956, Ser. No. 613,346

9 Claims. (Cl. 73—196)

This invention relates to mass flow ratio sensing devices for systems in which two fluids are required to be utilized in a predetermined ratio, or in which it is necessary to determine the ratio in which the liquids are flowing in order to make any necessary adjustment in the flow.

An example of the first type of control is a system in which a first fluid is circulated at a constant rate, and a second fluid is required to be used with the first in a predetermined ratio, and the supply of both liquids is intended to become exhausted simultaneously. Under certain circumstances the ratio of the second liquid to the first may become different from that desired owing to some malfunction, but it is preferable to maintain the flow of the second liquid at a rate such that it will be used up at the same time as the first, notwithstanding that the ratio of the two liquids is thereby not the optimum ratio desired.

An example of the second type of control is when it is desired to ascertain by experiment what ratio of a second liquid must be used with a first to give optimum results in actual practice; the flow of the second liquid being adjusted until maximum results are obtained, and the device operating automatically to give an indication of the corresponding ratio.

An object of the invention is to provide a simple apparatus utilizing the principle of angular momentum exchange to afford a mass flow ratio sensing device which can be used to maintain a required flow ratio of two liquids by automatic control of the flow of one of said liquids.

A further object of the invention is to provide an apparatus utilizing the principle of angular momentum exchange to give an indication of departure from a selected ratio of flow of two liquids.

Another object of the invention is to provide an apparatus utilizing the principle of angular momentum exchange in a device to maintain a predetermined flow of two liquids and give an indication of the actual ratio of the liquids.

With these and other objects in view the invention comprises a gravimetric flow ratio sensing apparatus having means effective to cause flow of two streams of fluid at a constant or variable ratio, means effective to impart an initial helical flow to said streams, movable means effective to reduce the angular momentum of said helical streams to zero thereby setting up torque in said movable means, and means to compare the torque produced in said movable means whereby the gravimetric ratio of said flows may be determined.

Figure 1 of the drawing is a side elevation of the device, partly in section to show interior parts.

Figs. 2a and 2b are diagrams of conventional circuits controlling valve 14 and motor 43, respectively.

The numeral 10 indicates a base support on which the device may be mounted, two coaxial cylinders 11 and 12 being supported thereon in any convenient manner. The first fluid A is led into cylinder 11 and a second fluid B is led into cylinder 12, the apparatus being intended to enable the gravimetric ratio of the fluids to be ascertained. The fluids may be supplied from reservoirs or by pumps. Flow through the cylinders may be regulated by control valves 13 and 14 on cylinders 11 and 12 respectively. Driving drums 15 and 16 are arranged to closely fit within the cylinders 11 and 12 and to be rotated at any independent speed by a common driving means, shown as an electric motor 17, and gearing between the motor and the common driving shaft 18. The driving drums are provided with axially arranged vanes and the rotation of these drums will of course impart angular momentum to the fluid flowing through the vanes. A pickup drum 19 is coaxially arranged with the driving drum 15, in cylinder 11 on a shaft 21 and a pickup drum 20 is similarly arranged in cylinder 12. Since the arrangement of pickup drums 19 and 20 is identical, the parts cannected to drum 19 only will be described.

The pickup drums are formed similarly to the driving drums and their purpose is to reduce to zero the angular momentum of the fluid streams, transforming the helical flow of the fluids to axial flow, and evidently in so doing, the pickup drums will absorb energy from the fluids. The torque produced in the pickup drum 19 is transmitted through shaft 21, crank arm 23 mounted on said shaft and crank pin 25 to a connecting link 27 which is pivotally secured to a bar 29. The corresponding parts associated with pickup drum 20 are identical therewith and are numbered 22, 24, 26 and 28.

The bar 29 is formed with an intermediate I section and a fulcrum member 30 is axially adjustable on a lead screw 32 secured in bearings 32a mounted on base 10 below the bar 29. Pins 31 screwed into the fulcrum member engage between the flanges of the I section, and a pointer 33 mounted on the fulcrum member 30 is arranged to read against a scale 34 mounted on the bar 29 with its "0" mark, indicated at 35, equidistant between the cylinders 11 and 12. One end of the bar 29 is furnished with a contact carrying arm 36, arranged to move over a control panel 37 carrying a series of contacts 38 connected in electrical circuits controlling solenoid valves 13 and 14. The movement of arm 36 may be directly observed on a vertical scale 36a mounted on the base 10.

The control panel 37 is adjustably mounted on the pedestal 39. The position of the fulcrum 30 relative to bar 29 may be manually adjusted by hand wheel 40 and gearing mounted on the lead screw 32 and on a shaft 40a rotated by the hand wheel.

An automatic adjustment of the fulcrum 30 relative to the bar 29 is also provided by a pickup coil 41 mounted on the control panel activated by a vane carried by the arm 36. The signals from the pickup coil may be amplified and operate a servo mechanism 42 controlling a reversible motor 43 connected by gearing 44 to the leadscrew 32.

It will be understood that electrical circuits of conventional type are provided controlled by switches arranged on a conveniently located control panel; reference may be made to the book "Servo-mechanism and Regulating System Design," by Chestnut and Mayer, vol. I, page 210, published 1951 by John Wiley and Sons, New York, N.Y.

*Operation*

In the operation of the device, the two fluids are sent through their respective conduits 11 and 12 in the direction of the arrows; and they are both caused to rotate in the same direction (for example, clockwise when viewed from the right-hand end) by action of the drive motor 17 on the respective driving drums 15 and 16. The fluid whirled by action of their respective driving drums is carried over to the respective pickup drums 19 and 20; and the rotating force of the fluid produces a torque on the pickup drums in the same direction as rotation of the driving drums. Thus, the bell cranks 23 and 24 are both urged in the same direction (for example, clockwise with reference to the right-hand side of the figure). This tendency of the bell cranks to rotate in the same direction tends to move the links 27 and 28 in the same direction which thus tends to push both ends of bar 29 in the same direction. It is obvious that if the forces on the bars 27 and 28 were equal and if the fulcrum 31 were midway between bars 27 and 28, there would be no rotation of the bar 29 on its fulcrum 31.

If, however, there be a difference in mass flow between the two fluids flowing through conduits 11 and 12, there will be a corresponding difference in the driving force of the rotating fluid in the respective pickup drums 19 and 20. This difference will produce a corresponding difference of the forces in the links 27 and 28 which will produce a resultant movement on the ends of bar 29, causing it to rotate on its fulcrum 31. If the bar 29 is thus rotated away from its normal zero positon, as indicated by the pointer 36, it can be readily brought back to the zero postiion by operation of hand wheel 40 which will rotate the worm and move the fulcrum member 30 lengthwise relative to the bar 29 until the bar 29 again is at its zero position. The position of the fulcrum 31 for this zero position of the bar can be read on the scale 35 and will be an indication of the relative mass flow of the two fluids.

When the device has been set with the fulcrum at the point required so that arm 36 is located on the null or midpoint of the control panel, due to the torque exerted by a pickup drum 19 multiplied by the lever arm, which is the distance from the fulcrum to the connection of link 27 to bar 29, being equal to the torque exerted by pickup drum 20 multiplied by the lever arm, which is the distance from the fulcrum to the connection of the link 28 to the bar 29, the ratio of the gravimetric flow of the fluids should evidently be in the ratio for which initial adjustment was made. If the ratio is upset by some malfunctioning of the apparatus, assuming the flow of A fluid to be maintained at a constant value, valve 14 will be automatically adjusted to increase or decrease the flow of fluid B to regain gravimetric balance of flow. If the automatic control of valve 14 is not desired but the actual ratio of flow is required to be known, the pickup 41 can be utilized to cause energization of motor 43 through the servo mechanism to rotate the lead screw and move the fulcrum until bar 29 is in equilibrium, the pointer 33 will then read the actual ratio of the flow of fluid B to fluid A.

While a preferred embodiment of the invention has been specifically described and illustrated herein, it is to be understood that various changes in, and modifications of, the described embodiment may be made by those skilled in the art without departing from the scope of the invention as defined by the appended claims.

I claim:

1. A gravimetric flow ratio sensing apparatus comprising: a first conduit and a second conduit each adapted to enclose a flowing body of fluid, the ratio of the flow of fluids being determined by the apparatus; a rotary fluid driving element in each conduit imparting angular momentum to the fluid flowing through that conduit; a common means for rotating said rotary fluid driving elements at the same speed; a movable pickup member in each conduit receiving the fluid from the driving means and removing the angular momentum therefrom, torque being thereby set up in the pickup members; and means for comparing the torque of said pickup means to determine the gravimetric flow ratio of the fluids.

2. A gravimetric flow ratio sensing apparatus comprising: a first conduit and a second conduit each adapted to enclose a flowing body of fluid, the ratio of the flow of fluids being determined by the apparatus; a rotary fluid driving element in each conduit imparting angular momentum to the fluid flowing through that conduit; a common means for rotating said rotary fluid driving elements at the same speed; a first pickup drum mounted in the first conduit coaxially with the fluid driving element therein to receive the fluid therefrom and remove the angular momentum therefrom whereby torque is set up in said first pickup drum; a second pickup drum mounted in the second conduit coaxially with the fluid driving element therein to receive the fluid therefrom and remove angular momentum therefrom whereby a torque is set up in said second pickup drum; and means for comparing the torque of said pickup drums to determine the gravimetric flow ratio of the fluids.

3. Apparatus as set forth in claim 2 and in which said common means for rotating the fluid driving means comprise: a common shaft on which said rotary fluid driving means are mounted; power means free of precise speed control for rotating said shaft; separate shafts on which each said pickup drums are mounted; and means for comparing the torque set up in said separate shafts by said pickup drums to determine the gravimetric flow ratio of the fluids.

4. Apparatus as set forth in claim 3 in which said means for comparing the torque set up in the shafts of the pickup drums comprise: a straight bar extending across the length of both conduits; means connected between one of said separate shafts and one end of said bar and between the other of said separate shafts and the opposite end of said bar, angular displacement of said bar due to difference in the torque transmitted by said pickup drums to the ends of the bar indicating the ratio of the gravimetric flow of the liquids.

5. Apparatus as set forth in claim 3 in which said means for comparing the torque set up in the shafts of the pickup drums comprise: a straight bar extending across the length of both conduits; means connected between one of said separate shafts and one end of said bar and between the other of said separate shafts and the opposite end of said bar, the angular displacement of said bar indicating the ratio of the gravimetric flow of the liquids; and means operated by the angular displacement of the bar to operate valve means effective to bring the gravimetric flow of the liquids to a predetermined ratio.

6. Apparatus as set forth in claim 4 and in which the means connected between the shafts of the pickup drums and the bar comprise: cranks of identical length secured to the ends of said shafts; and links connecting the ends of the cranks to the ends of the bar.

7. Apparatus as set forth in claim 4 and in which said straight bar is formed as a lever fulcrumed between its ends; and a member on which said fulcrum is mounted adjustable axially along the length of said lever.

8. Apparatus as set forth in claim 7 and in addition comprising: means operated by the angular movement of an end of said lever due to inequality of the torques transmitted to the ends thereof: and means responsive to said movement to effect displacement of the fulcrum to a position to restore equilibrium of said lever.

9. Apparatus as set forth in claim 8 and in addition comprising a displacement indicator mounted on said lever to enable the setting of said fulcrum to be observed and thereby to give an indication of the mass flow ratio of the fluids flowing through said conduits.

References Cited in the file of this patent

UNITED STATES PATENTS

| | | |
|---|---|---|
| 2,487,310 | Chandler | Nov. 8, 1949 |
| 2,538,824 | Andresen | Jan. 23, 1951 |
| 2,549,624 | Moore | Apr. 17, 1951 |
| 2,714,310 | Jennings | Aug. 2, 1955 |
| 2,775,125 | Peaceman | Dec. 25, 1956 |